Jan. 12, 1932.   J. M. EDWARDS   1,841,280
BRAKING DEVICE
Filed Feb. 6, 1928   2 Sheets-Sheet 1

James M. Edwards
INVENTOR

BY Victor J. Evans
ATTORNEY

Jan. 12, 1932.  J. M. EDWARDS  1,841,280
BRAKING DEVICE
Filed Feb. 6, 1928  2 Sheets-Sheet 2
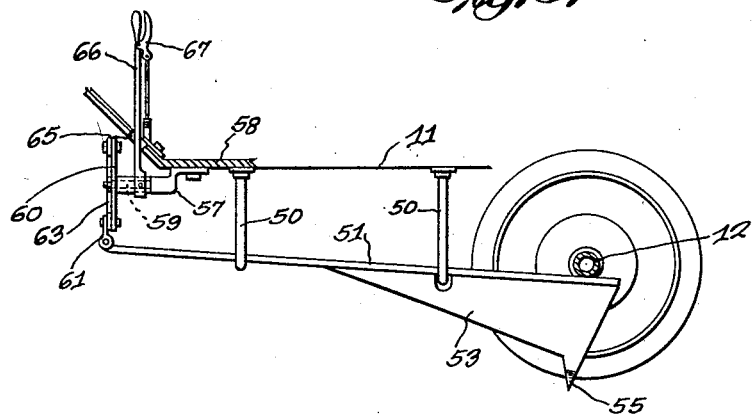
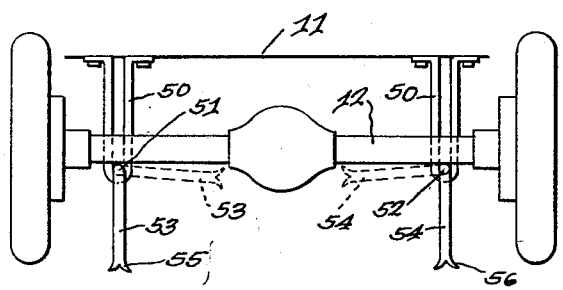
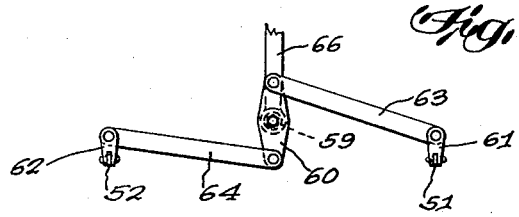
James M. Edwards
INVENTOR
BY Victor J. Evans
ATTORNEY Patented Jan. 12, 1932

1,841,286

UNITED STATES PATENT OFFICE

JAMES M. EDWARDS, OF CHICAGO, ILLINOIS

BRAKING DEVICE

Application filed February 6, 1928. Serial No. 252,401.

This invention relates to certain novel improvements in braking devices and is particularly directed to a construction which may be used either with or without the usual braking mechanisms provided on motor vehicles and the like.

It is among the objects of my invention to provide a braking device of the above named character, which will be arranged such that the vehicle may be substantially instantaneously stopped.

Another object of the invention is to provide a device of the foregoing character which may be installed on vehicles of the above named type without making any extensive alterations therein.

A still further object of the invention is to provide a braking mechanism of the above described character which may be used on railway vehicles and other similar devices, as well as on so called automotive vehicles.

Other objects will appear hereinafter.

The invention consists in the novel combination and arrangement of parts to be hereinafter described and claimed.

The invention will be best understood by reference to the accompanying drawings, showing the preferred form of construction and in which;

Fig. 5 is a side view depicting a modified form of construction for my invention;

Fig. 6 is an end view of the device depicted in Fig. 5; and

Fig. 7 is a detail view depicting a link construction employed for operating the device depicted in Figs. 5 and 6;

Figure 1:
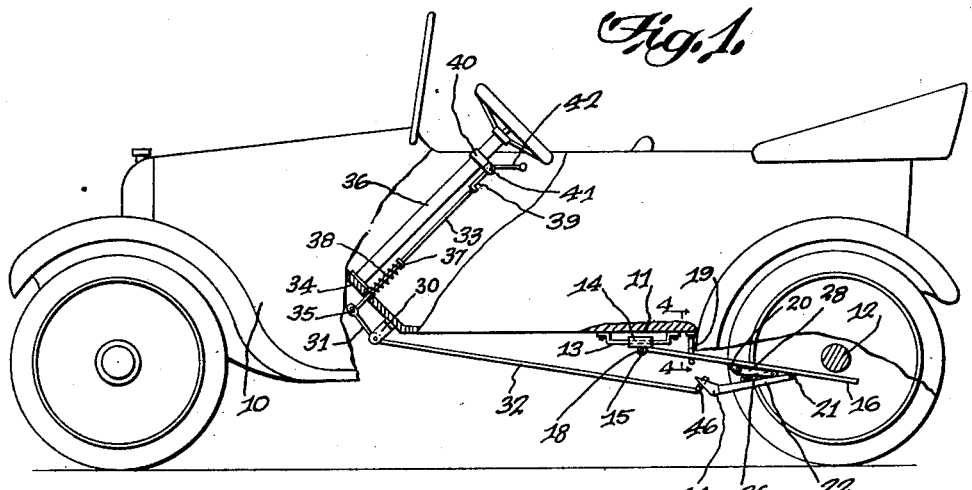
Fig. 1 is a side view of a vehicle embodying a preferred form of construction for my invention and in which certain parts are shown in elevation and certain parts are shown in section.
Figure 2:
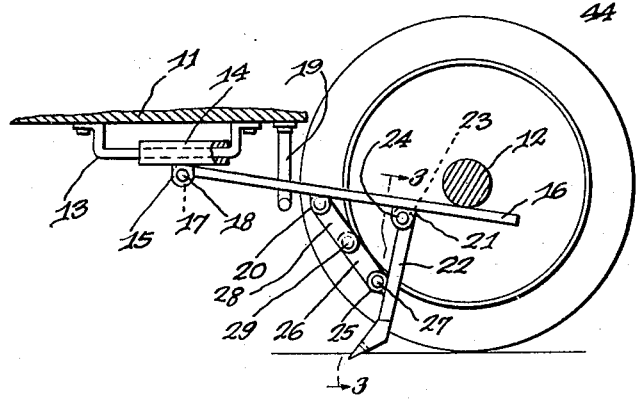
Fig. 2 is an enlarged detail view depicting my improved braking device in operative position.

In the drawings, and more particularly to Figs. 1 to 4, my improved braking device is shown as being associated with a vehicle 10 which embodies a chassis generically indicated by 11 in the drawings. At a suitable point on the chassis 11, preferably near the rear axle 12, a substantially U-shaped guide rod 13 is mounted. A sleeve 14 is mounted for sliding reciprocation on the guide rod 13 and has an ear 15 provided thereon. A plate 16 is provided which includes a clamp portion 17 through which a pintle 18 is extended, said pintle 18 extending through the ear 15 so as to pivotally connect the plate 16 with the sleeve 14. As is clearly illustrated in Fig. 2 plate 16 extends beyond the rear axle 12 and is disposed beneath said axle. In order to limit downward movement of the plate 16 a substantially U-shaped bracket 19 is secured to the chassis 11 at the point best illustrated in Fig. 2, said U-shaped bracket engaging the plate 16 in the manner best illustrated in Fig. 4.

On the under side of the plate 16, at substantially the mid point in the extent thereof, a downwardly protruding ear 20 is provided. Intermediate the ear 20 and the end of the plate 16, below the axle 12, an ear construction 21 is provided. An arm 22 includes a bearing portion 23 that is disposed between the ears of the ear construction 21 and which is pivotally connected thereto by the bolt 24. Ears 25 are provided on the arm 22 and the link 26 is pivotally connected thereto by the bolt and nut structure 27. A link 28 is suitably connected to the ear structure 20 and the links 26 and 28 are pivotally connected together as at 29 so as to form a toggle joint.

Adjacent the front of the vehicle 10 and preferably associated with the control mechanisms thereof is the control for my improved braking device. A suitable bearing 30 is secured to the floor boards of the vehicle or to the chassis 11 and a lever comprised of short arm 31 and long arm 32 is pivotally mounted on said bearing. A rod 33 extends through the floor board 34 and is suitably connected to the end of arm 31 as at 35. The arm 33 is preferably disposed parallel to the steering column 36 of the vehicle. In the present instance the collar 37 is mounted on the rod 33 and a coil spring 38 is disposed between the collar 37 and the upper side of the floor board 34 and said spring tends to urge said rod 33 in an upward direction. Upward movement of the rod 33 is limited by the latch dog 39 which is pivotally mounted on the collar 40 as indicated at 41 and which includes an operating handle 42. The collar 40 is in the present instance mounted on the steering column 36.

Figure 3:
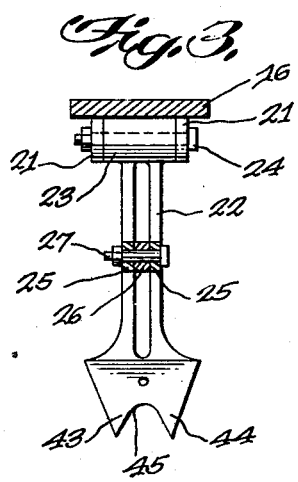
Fig. 3 is a sectional view taken on the line 3—3 on Fig. 2.
Figure 4:
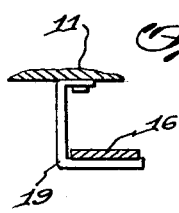
Fig. 4 is a fragmental sectional view taken substantially on the line 4—4 on Fig. 1.

As is best illustrated in Fig. 3, the lower end of the arm 22 is formed to provide piercing points 43 and 44. A recess 45 is disposed between the points 43 and 44 and a hook portion 46 of the arm 32 is normally disposed in this recess in order to hold the arm 22 and aligned parts in inoperative position, as illustrated in Fig. 1. The hook portion 46 is retained in the recess 45 by the wedging action exerted on the hook portion by the rod 32.

If during the operation of the vehicle 10 the operator finds that a substantially instantaneous stop is necessary, he strikes the handle 42 so as to pivot the latch dog 39 out of engagement with the end of rod 33. This permits spring 38 to force the rod 33 upwardly and this movement is transmitted to arm 31 of the lever. This movement of arm 31 causes arm 32 to move downwardly which releases the hook portion 46 thereof from the recess 45. This permits arm 22 to assume the position shown in Fig. 2 whereupon the piercing elements 43 and 44 enter into the surface being traversed and anchor themselves. The sleeve 14 has frictional engagement with the guide rod 13 and during inoperative position the sleeve 14 is disposed at the forward end of the guide rod 13 and retained in position by frictional contact with the guide rod 13. The sleeve 14 slides along the guide rod 13 and upon engaging the rear leg thereof the plate 16 is cammed up under the axle 12 and lifts the wheels of the vehicle from the ground thus interrupting movement of the vehicle. After the arm 22 has been released from engagement with the hook portion 46 and the braking action has taken place as described above the automobile may be reversed a short distance to release the arm 22 which may then again be reinserted into engagement with the hook portion 46 of rod 32.

In Figs. 5 to 7 inclusive, a modified form of construction for my device is depicted. In this construction substantially U-shaped brackets, such as those indicated by 50, are suspended from the chassis 11. Rotatable rods 51 and 52 are supported by the supporting structures 50 on opposite sides of the vehicle in juxtaposition to the wheels thereof; at the rear end of the rods 51 and 52 substantially triangular shaped plates 53 and 54 are provided, which include projecting portions 55 and 56, which are arranged so as to embody piercing points.

At the front of the vehicle, preferably adjacent the driver's compartment, a bracket 57 is suitably secured to the under side of the floor boards 58. A stud shaft 59 is journaled in the bracket 57 and the connecting member 60 is modeled on the outer end of the stud shaft 59. At the forward end of the rods 51 and 52 connecting members 61 and 62 are modeled. As is best illustrated in Fig. 7, the connecting member 60 is disposed so as to lie mid-way between the rods 51 and 52 and is disposed so as to extend parallel with the connecting members 61 and 62. A link 63 connects one end of the connecting member 60 to the connecting member 61 and a link 64 connects one end of the connecting member 60 to the connecting member 62. An opening 65 is provided in the floor board 68 and an operating arm extends therethru, which is suitably secured to the shaft 59. A suitable latch structure such as that indicated by 67 in the drawings is associated with the arm 66.

When the brake is inoperative, the arm 66 is disposed at one end of the opening 65 and this causes the triangularly shaped portions 53 and 54 to be disposed in the dotted line position of Fig. 6 and the latch structure 67 serves to hold the parts in this position. By releasing the latch structure 67 and moving the arm 66 crosswise of the longitudinal axis of the car to the opposite end of the opening 65, the triangular shaped portions 53 and 54 may be moved into the full line position of Fig. 6 and the piercing portions 55 and 56 thereof will enter into and grip the surface being traversed, which will cause the rear portions of the rods 51 and 52 to move up under the rear axle of the vehicle and thus raise the wheels carried by said axle out of engagement with the surface being traversed, which will obviously quickly stop the vehicle.

While in the foregoing I have described two particular constructions for my invention, it is to be understood that certain changes and modifications might be made in the matter of construction and still not depart from the purview of my invention which is adapted to include a structure carrying portions adapted to enter the surface being traversed so as to substantially instantaneously stop movement of the vehicle. It is also to be understood that my device might be used in connection with vehicles operating on a track, as well as motor vehicles such as those I have heretofore described.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variation and modifications as come within the scope of the appended claims.

Having thus described my invention, what I claim as new and desire to protect by Letters Patent is:

1. In combination with a vehicle, a slidable supporting member having a portion thereof disposed below an axle of said vehicle, means connected to said member having surface engaging portions mounted thereon adapted to force said member into engagement with said axle whereby to elevate said axle when said portions are in engaging position, and means for holding said engaging means in non-engaging position.

2. In combination with a vehicle having a chassis, an axle, and wheels carried by said axle, a guide member mounted on said chassis, a sleeve mounted on said guide member, a plate pivotally connected to said sleeve and having portions thereof disposed below said axle, means carried by said chassis for limiting downward movement of said plate, an arm having surface engaging portions thereon, means for connecting said arm to said plate, and means for holding said arm and said plate in inoperative position.

3. In combination with a vehicle having a chassis, an axle, and wheels carried by said axle, a guide member mounted on said chassis, a sleeve mounted on said guide member, a plate pivotally connected to said sleeve and having portions thereof disposed below said axle, means carried by said chassis for limiting downward movement of said plate, an arm having surface engaging portions thereon and adapted to be pivotally connected to said plate, links pivotally connected to said arm and to said plate adapted to limit the relative movement therebetween, and means for holding said arm and said plate in inoperative position.

4. In combination with a vehicle having a chassis, an axle, and wheels carried by said axle, a guide member mounted on said chassis, a sleeve mounted on said guide member, a plate pivotally connected to said sleeve and having portions thereof disposed below said axle, means carried by said chassis for limiting downward movement of said plate, an arm having surface engaging portions thereon and adapted to be pivotally connected to said plate, links pivotally connected to said arm and to said plate adapted to limit the relative movement therebetween, a bell crank pivotally connected to said vehicle including an arm adapted to hold said first named arm and said plate in inoperative position, a spring urged rod pivotally connected to the other arm of said bell crank, and means for limiting movement of said spring urged arm adapted to be quickly moved from limiting position whereby to release said rod.

In testimony whereof I affix my signature.

JAMES M. EDWARDS.